United States Patent
Overby et al.

(10) Patent No.: US 11,202,453 B2
(45) Date of Patent: Dec. 21, 2021

(54) GRIPPER DEVICE

(71) Applicant: MAREL A/S, Arhus N (DK)

(72) Inventors: Jens Overby, Abyhoj (DK); Jens Kongensholm Dalgaard, Horning (DK); Niels Bjarne Hundtofte, Ega (DK)

(73) Assignee: MAREL A/S, Arhus N (DK)

( * ) Notice: Subject to any disclaimer, the term of this patent is extended or adjusted under 35 U.S.C. 154(b) by 257 days.

(21) Appl. No.: 16/330,405

(22) PCT Filed: Sep. 5, 2017

(86) PCT No.: PCT/EP2017/072209
§ 371 (c)(1),
(2) Date: Mar. 5, 2019

(87) PCT Pub. No.: WO2018/042054
PCT Pub. Date: Mar. 8, 2018

(65) Prior Publication Data
US 2021/0068406 A1    Mar. 11, 2021

(30) Foreign Application Priority Data
Sep. 5, 2016 (DK) .......................... PA 2016 70681

(51) Int. Cl.
*B25J 15/00* (2006.01)
*B65B 25/06* (2006.01)
(Continued)

(52) U.S. Cl.
CPC ...... *A22C 17/0093* (2013.01); *A22C 21/0053* (2013.01); *B25J 11/0045* (2013.01);
(Continued)

(58) Field of Classification Search
CPC .......................... B25J 15/0004; B25J 15/0033; B25J 15/0213; B25J 15/024; B25J 11/0045;
(Continued)

(56) References Cited

U.S. PATENT DOCUMENTS 4,621,852 A * 11/1986 Maki ........................ B25J 15/10
                                                                    294/67.22
5,018,338 A      5/1991 Jurchuk et al.
(Continued)

FOREIGN PATENT DOCUMENTS

EP        1792831 A1    6/2007
EP        2155589 A1    2/2010
(Continued)

OTHER PUBLICATIONS

Danish Search Report from DK Application No. PA 2016 70681, dated Feb. 24, 2017.
(Continued)

*Primary Examiner* — Dean J Kramer
(74) *Attorney, Agent, or Firm* — Workman Nydegger

(57) ABSTRACT

A gripper device is configured to pick up a pliable food product having a tail-like part from a pick-up area and releasing it at a releasing area, where a support is provided. A pair of jaws is mounted to the support for movement of distal ends thereof towards each other defining a closing position of the pair of jaws and away from each other defining an open position of the pair of jaws. A tail bender device is attached to the support and adjacent to one end of the pair of jaws. The tail bender device is moveable in relation to the pair of jaws and is configured to bend the tail-like part while transferring the food product from the pick-up area until releasing it at the releasing area.

13 Claims, 2 Drawing Sheets

(51) Int. Cl.
  *B65B 35/16* (2006.01)
  *A22C 17/00* (2006.01)
  *A22C 21/00* (2006.01)
  *B25J 11/00* (2006.01)
  *B25J 15/02* (2006.01)
(52) U.S. Cl.
  CPC ....... *B25J 15/0004* (2013.01); *B25J 15/0033* (2013.01); *B25J 15/024* (2013.01); *B65B 25/064* (2013.01); *B65B 35/16* (2013.01)
(58) Field of Classification Search
  CPC . A22C 17/0093; A22C 21/0053; B65B 5/105; B65B 25/064; B65B 35/16
  See application file for complete search history.

(56) References Cited

U.S. PATENT DOCUMENTS

| | | | | |
|---|---|---|---|---|
| 5,199,845 | A * | 4/1993 | Hirashima | ............... B25J 15/10 294/86.4 |
| 7,887,108 | B1 * | 2/2011 | Cawley | ................ B25J 15/0266 294/2 |
| 8,157,308 | B2 * | 4/2012 | Pedersen | .............. B25J 11/0045 294/213 |
| 8,688,264 | B2 | 4/2014 | Nignon | |
| 8,807,913 | B2 * | 8/2014 | Billing | ..................... B65B 5/06 414/792.9 |
| 2011/0166696 | A1 | 7/2011 | Nignon | |
| 2012/0086226 | A1 | 4/2012 | Weber | |

FOREIGN PATENT DOCUMENTS

| | | |
|---|---|---|
| EP | 2168892 A1 | 3/2010 |
| EP | 2689899 A1 | 1/2014 |
| FR | 2936502 A1 | 4/2010 |
| GB | 2415944 A | 1/2006 |
| GB | 2435252 A | 8/2007 |

OTHER PUBLICATIONS

International Search Report from PCT Application No. PCT/EP2017/072209, dated Jan. 8, 2018.

* cited by examiner

GRIPPER DEVICE

FIELD OF THE INVENTION

The present invention relates to a gripper device for picking up a pliable food product having a tail-like part from a pick up area surface and releasing it at a releasing area.

BACKGROUND OF THE INVENTION

EP2155589 discloses a gripper device configured to pick up a pliable food product such as chicken breasts from a pick up area surface and releasing it at a releasing area. A pair of jaws are pivotally mounted to the support and a belt is provided extending directly across the distal ends of the grippers when they are spaced apart so that the belt is able to extend over the food product to be picked up and to extend around the food product when the grippers have been moved towards each other to pick up the food product such that their distal ends penetrate between the food product and the support surface.

Due to how slippery the food products are, e.g. said chicken breast, they sometimes fall off the gripper device during the movement to the releasing area, which commonly is a tray. Also, in particular if the food products are chicken breasts having a kind of a tail part, the packing of the chicken breasts into the tray such that the visual appearance is attractive towards customers is difficult, if not impossible. Therefore, batching systems that utilize robotic systems with such a gripper device require a manual labour to manually adjust the position of the chicken breasts in the tray such that the visual appearance is acceptable. This of course increases the overall size of the batching system, and increases the overall costs due to the manual labour that is needed.

Moreover, in some cases when picking up and delivering such a pliable food products such as chicken breasts, the tail part may go over the edge of the tray which makes it difficult to seal the tray afterwards.

SUMMARY OF THE INVENTION

On the above background it is an object of embodiments of the present invention to provide an improved gripper device that prevents food products from falling out from the gripper device, and that is furthermore capable of placing the food products into e.g. trays with nice visual appearance.

In general, the invention preferably seeks to mitigate, alleviate or eliminate one or more of the above mentioned disadvantages of the prior art singly or in any combination. In particular, it may be seen as an object of embodiments of the present invention to provide a device that solves the above mentioned problems, or other problems.

To better address one or more of these concerns, in a first aspect of the invention a gripper device is provided configured to pick up a pliable food product having a tail-like part from a pick up area and releasing it at a releasing area, comprising:

a support, a pair of jaws mounted to the support for movement of distal ends thereof towards each other defining a closing position of the pair of jaws and away from each other defining an open position of the pair of jaws, and a tail bender device attached to the support and adjacent to one end of the pair of jaws, the tail bender device being moveable in relation to the pair of jaws and is configured to bend the tail-like part while transferring the food product from the pick up area until releasing it at the releasing area, wherein the movement the tail bender device relative to the pair of jaws comprises moving the tail bender device at least partly below the pair of jaws when being in closing position such that said bending of the tail-like part comprises pushing the tail-like part downward.

Accordingly, a gripper device is provided that is capable of picking up a food product having a tail-like part, such as a chicken fillet or chicken breast, and release it into e.g. a tray, container, and the like, such that the visual appearance fulfils visual appearance requirements made by customers. In case of chicken fillet/breasts, such a visual appearance requirement is that the shape of the chicken fillets, e.g. three or four, has a kind of a drop-like shape.

The term "tail-like" part may according to the present invention also be understood as an end part, or and end part that has less mass than the opposite end part.

In one embodiment, the tail bender device comprises a plate structure connected to a spring load mechanism, external source such as pneumatic cylinder or air cylinder, the plate structure being configured to carry out said pushing of the tail-like part downward. As an example, the spring load mechanism may in one embodiment be designed such that at a rest position the plate structure extends at least partly below the distal ends of said pair of jaws, and where when picking up the pliable product the plate structure initially comes in contact with the tail-like part followed by an upward movement of the plate structure via a compression in the spring load mechanism as the pair of jaws move to pick up area surface followed by a movement of the distal ends towards each other.

In one embodiment, subsequent to picking up the food product and moving the pair of jaws away from the pick up area surface the potential energy in the spring load mechanism is automatically released via downward movement of the plate structure back to said rest position. Accordingly, a simple mechanical solution is provided for pushing the tail-like part automatically down via the plate structure, where no additional advancing mechanism such as any type of an activator is needed. This will obviously reduce the weight of the gripper device and simplify it greatly.

In one embodiment, the tail bender device is arranged at one end of the pair of jaws, where at the opposite end each of the pair of jaws comprises a side portions at one end of the pair of jaws such that when the pair of jaws are in a closing position the side portions meet and define an end wall portion at one end of the pair of jaws. In is thus ensured that the food product will not fall out from the gripper device since the end where the tail bender device is arranged acts as a kind of a stopper for that end preventing the food product to fall out from the gripper device, and where said side portions prevent the food product for falling from the opposite ends. Moreover, in said closing position the food product becomes preserved in a fixed length meaning that when releasing it into e.g. a tray food products will appear has having the same length, which will improve the visual appearance of the food products.

In one embodiment, the tail bender device is operably connected to the support such that when moving the distal ends of the pair of jaws towards each other is automatically followed by said downward movement of the tail bender device.

In an embodiment, the tail bender device is arranged at both ends of the pair of jaws. Thus, the orientation of the gripper device relative to the pliable food product is not important.

In one embodiment, the gripper device further comprises a belt arranged to extend directly across the distal ends of the grippers when they are spaced apart so that the belt is able to extend over the food product to be picked up and to extend around the food product when the grippers have been moved towards each other to pick up the food product such that their distal ends penetrate between the food product and the support surface. The belt acts thus in a way as a kind of a mould that will automatically encircle the food product and facilitate the visual appearance of the food product after being released into e.g. a tray.

In one embodiment, the gripper device further comprises a blowing device arranged in the vicinity of the tail bender device configured to provide a downward blowing function between the tail bender device and the tail-like part when releasing the food product at the releasing area. Accordingly, by blowing air down between the tail bender at the tail, it is ensured that the food product is released without sticking to the tail bender device.

It should be noted that by the term "downward movement" may according to the present invention be understood as "direct downward movement" or movement that includes e.g. an arc movement.

In one embodiment, the movement of the tail bender device relative to the pair of jaws comprises moving the tail bender device sidewise towards food product such that said bending of the tail-like part comprises compressing the food product into a shorter shape.

In a second aspect of the invention, a method is provided of picking up a pliable food product having a tail-like part from a pick up area and releasing it at a releasing area using a gripper which comprises:

a support, a pair of jaws mounted to the support for movement of distal ends thereof towards each other defining a closing position of the pair of jaws and away from each other defining an open position of the pair of jaws, and a tail bender device attached to the support and adjacent to one end of the pair of jaws, the tail bender device being moveable in relation to the pair of jaws and is configured to bend the tail-like part while transferring the food product from the pick up area until releasing it at the releasing area wherein the step of moving the tail bender device in relation to the pair of jaws comprises moving the tail bender device at least partly below the pair of jaws when being in closing position such that said bending of the tail-like part comprises pushing the tail-like part downward.

In one embodiment, the step of moving the tail bender device in relation to the pair of jaws comprises moving the tail bender device sidewise towards food product such that said bending of the tail-like part comprises compressing the food product into a shorter shape.

In one embodiment, the orientation of the tail bender device is controlled by a control unit in response from image data indicating the position of the tail-like part. This increases the flexibility of the gripper device since now the pliable food products do not necessarily need to be oriented in the same way meaning that the gripper device with a tail bender device at only one end will automatically adjust the angular position such that the tail bender device is oriented correctly relative to the food product, i.e. such that the tail bender device is at the same side as the tail-like part before picking up the food product.

In a third aspect of the invention, a robotic system is provided comprising:

a position detection means for detecting positions of incoming pliable food products having a tail-like part, a gripper device comprising:

a support, a pair of jaws mounted to the support for movement of distal ends thereof towards each other defining a closing position of the pair of jaws and away from each other defining an open position of the pair of jaws, and a tail bender device attached to the support and adjacent to one end of the pair of jaws, a control unit for controlling the movement of the gripper device in accordance to the detected positions of the pliable food products when picking up the pliable food product having a tail-like part from a pick up area and releasing it at a releasing area, wherein the tail bender device is moveable in relation to the pair of jaws and is configured to bend the tail-like part while transferring the food product from the pick up area until releasing it at the releasing area wherein the step of moving the tail bender device in relation to the pair of jaws comprises moving the tail bender device at least partly below the pair of jaws when being in closing position such that said bending of the tail-like part comprises pushing the tail-like part downward.

The incoming food products are typically conveyed by a conveyor comprising e.g. an endless belt from an infeed area to the pick up area where the food products are removed from the endless belt at the pick up area and placed e.g. into trays. The position detection means may comprise any kind of a vision device that detects the position of the food products on the conveyor belt, and where e.g. via any kind of tracking this position is tracked until the food products are picked up. This position is used as an operation parameter by the control unit to accurately positioning the gripper device, and also to indicate at what end the tail-like parts are, i.e. so that the tail bender device is at the right side of the food products when they are picked up.

BRIEF DESCRIPTION OF THE DRAWINGS

Embodiments of the invention will be described, by way of example only, with reference to the drawings, in which.

DESCRIPTION OF EMBODIMENTS

Figure 1A:
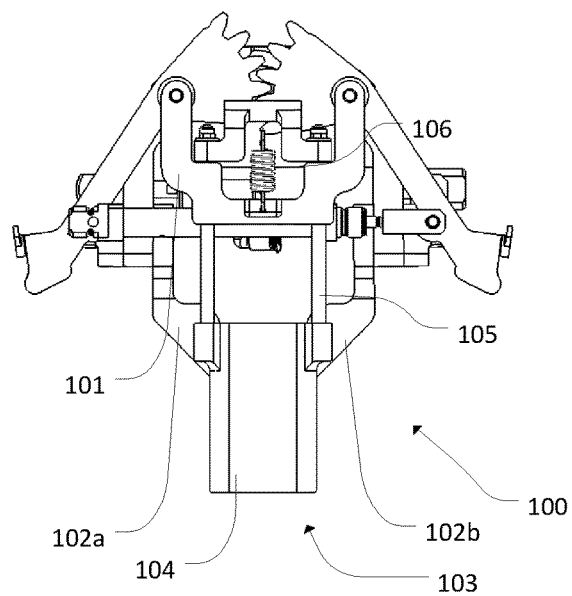
FIGS. 1a-1c and FIG. 2 show two different embodiments of a gripper device according to the present invention.
Figure 1B:
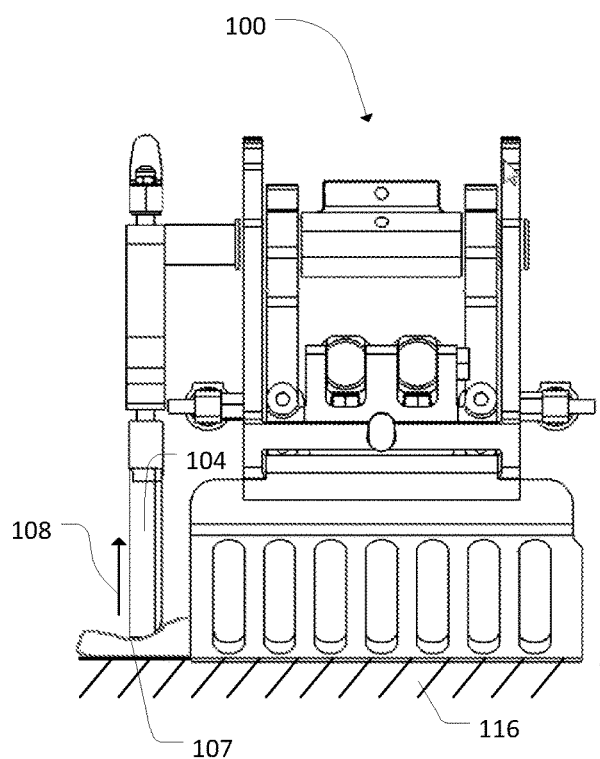
Figure 1C:
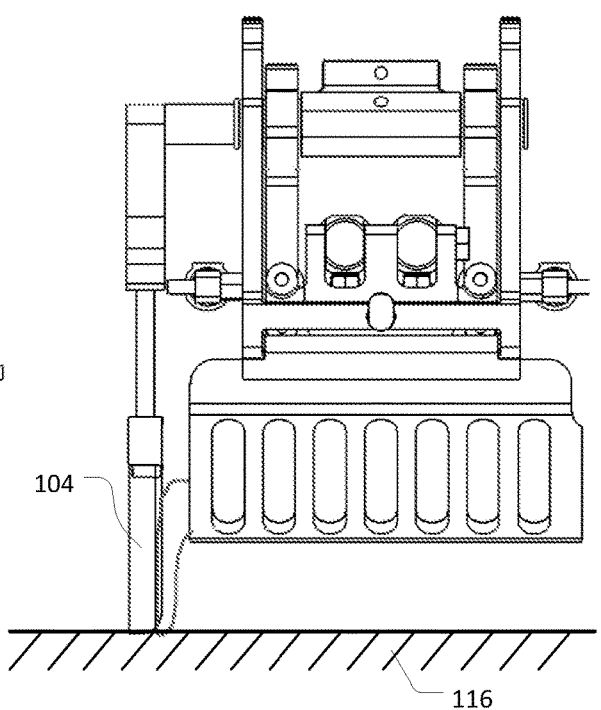

FIG. 1a-c shows one embodiment of a gripper device 100 according to the present invention configured to pick up a pliable food product having a tail-like part 107 from a pick up area surface and releasing it at a releasing area. The gripper device 100 comprises a support 101, a pair of jaws 102a,b mounted to the support 101 for movement of distal ends thereof towards each other defining a closing position of the pair of jaws and away from each other defining an open position of the pair of jaws, and a tail bender device 103 attached to the support and adjacent to at least one end of the pair of jaws, or as shown here at one end of the pair of jaws 102a,b. The tail bender device 103 is moveable in relation to the pair of jaws 102a,b and is configured to move at least partly below the pair of jaws when being in closing position and thus to push the tail-like part downward while transferring the food product from the pick up area until releasing it at the releasing area.

A vision system or the like may be provided to determine at which end the tail-like part is, and this data may then be used by a control unit (not shown) to ensure that the tail bender device is positioned above the tail-like part.

In the embodiment shown here, the tail bender device comprises a plate structure 104 slidable attached to a rail 105 and connected to a spring load mechanism 106 where the plate structure 104 is configured to carry out said pushing of the tail-like part downward. The spring load mechanism is designed such that at a rest position the plate structure 104 extends below the distal ends of said pair of jaws.

FIG. 1b shows where the gripper device has been moved adjacent to the pick up area surface 116 with the tail bender device on the same side as the tail-like part 107. Since the plate structure extends below the pair of jaws, it comes initially in contact with the tail-like part followed by an upward movement of the plate structure as indicated by the arrow 108 via a compression in the spring load mechanism as the pair of jaws move to the pick up area surface 116, where they move from said open position to said closing position where distal ends move towards each other and under the pliable food product (not shown here).

FIG. 1c shows where the gripper device after picking up the food product and moves the pair of jaws away from the pick up area surface 116. The potential energy stored in the spring load mechanism is automatically released via downward movement of the plate structure back to said rest position.

The gripper device may in one embodiment further comprise a belt arranged to extend directly across the distal ends of the grippers when they are spaced apart so that the belt is able to extend over the food product to be picked up and to extend around the food product when the grippers have been moved towards each other to pick up the food product such that their distal ends penetrate between the food product and the support surface.

It should be noted that the spring load may easily be replaced with an air piston, pneumatic driven cylinder and similar devices well known to a person skilled in the art.

Figure 2:
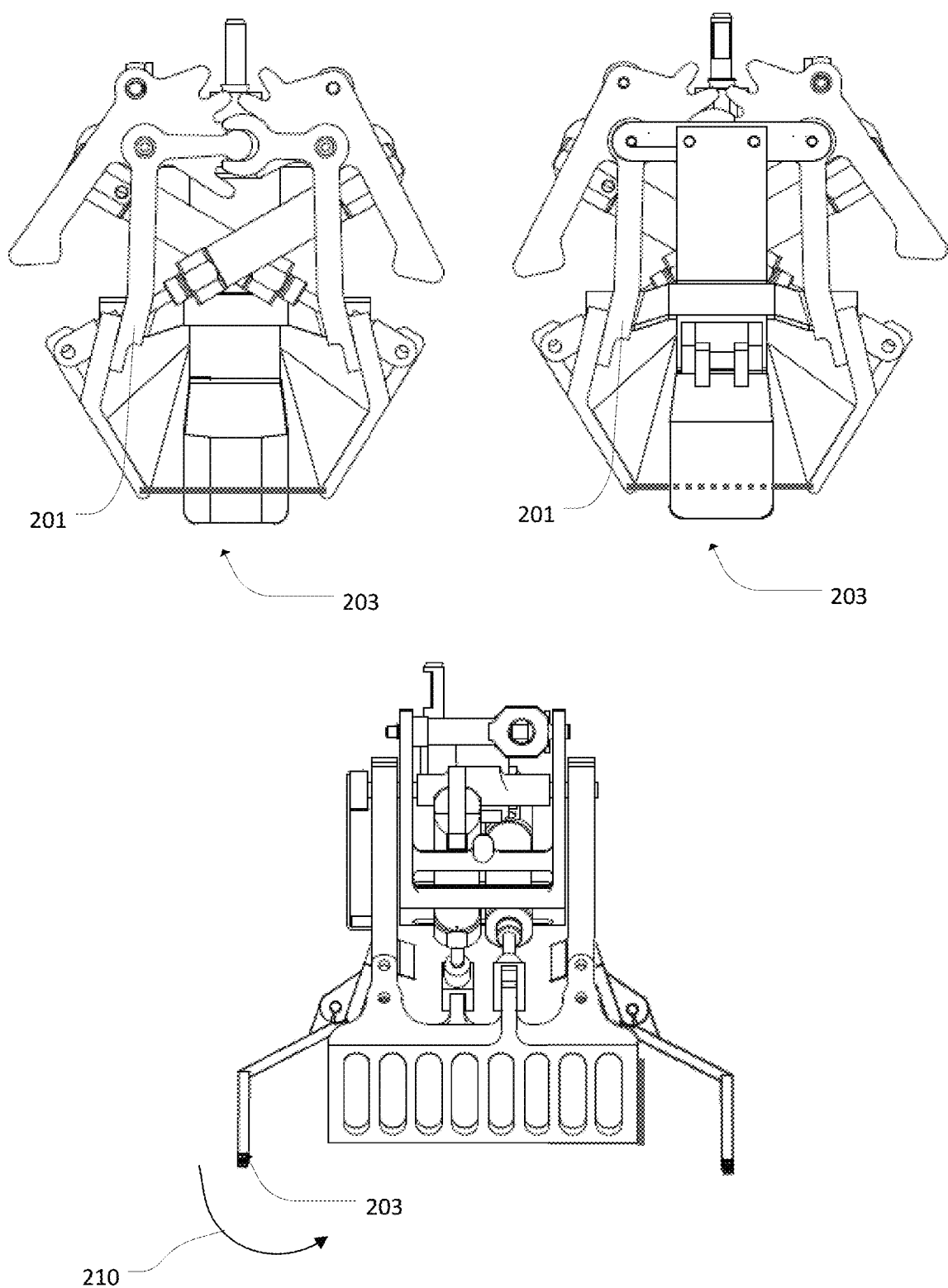

FIG. 2 shows another embodiment of the gripper device shown in FIG. 1, where the tail bender device 203 is operably connected to the support 201 such that when moving the distal ends of the pair of jaws towards each other said movement of the tail bender device is provided in more like an arc movement as shown by the arrow 210 causing the pushing of the tail-like part downward.

Although not shown here, the gripper device is preferably part of a robotic system comprising a position detection means, e.g. any kind of a vision system, for detecting positions of incoming pliable food products having a tail-like part, e.g. a robotic arm to which the gripper device is attached to, a control unit for controlling the movement of the robotic arm and the gripper device in accordance to the detected positions of the pliable food products when picking up the pliable food product having a tail-like part from a pick up area and releasing it at a releasing area. This may be of particular relevance when the tail bender device is located at only one end of the gripper device so as to ensure that the tail bender device is at the same end as the tail-like part of the pliable product.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A gripper device configured to pick up a pliable food product having a tail-like part from a pick up area and releasing it at a releasing area, comprising:
   a support,
   a pair of jaws mounted to the support for movement of distal ends thereof towards each other defining a closing position of the pair of jaws and away from each other defining an open position of the pair of jaws, and
   a tail bender device attached to the support and adjacent to one end of the pair of jaws, the tail bender device being moveable in relation to the pair of jaws and is configured to bend the tail-like part while transferring the food product from the pick up area until releasing it at the releasing area,
   wherein the movement of the tail bender device relative to the pair of jaws comprises a movement of the tail bender device at least partly below the pair of jaws when being in closing position such that said bending of the tail-like part comprises pushing the tail-like part downward;
   wherein the tail bender device is intersected by a plane parallel with movement of the tail bender device and placed between the pair of jaws at least in the open position of the pair of jaws.

2. The gripper device according to claim 1, wherein the tail bender device comprises a plate structure connected to a spring load mechanism, the plate structure being configured to carry out said pushing of the tail-like part downward.

3. The gripper device according to claim 2, wherein the spring load mechanism is designed such that at a rest position the plate structure extends at least partly below the distal ends of said pair of jaws, and where when picking up the pliable product the plate structure initially comes in contact with the tail-like part followed by an upward movement of the plate structure via a compression in the spring load mechanism as the pair of jaws move to pick up area surface followed by a movement of the distal ends towards each other.

4. The gripper device according to claim 3, wherein subsequent to picking up the food product and moving the pair of jaws away from the pick up area surface the potential energy in the spring load mechanism is automatically released via downward movement of the plate structure back to said rest position.

5. The gripper device according to claim 1, wherein the tail bender device is arranged at one end of the pair of jaws, where at the opposite end each of the pair of jaws comprises a side portions at one end of the pair of jaws such that when the pair of jaws are in a closing position the side portions meet and define an end wall portion at one end of the pair of jaws.

6. The gripper device according to claim 1, wherein the tail bender device is operably connected to the support such that when moving the distal ends of the pair of jaws towards each other said downward movement of the tail bender device is automatically provided.

7. The gripper device according to claim 1, wherein the tail bender device is arranged at both ends of the pair of jaws.

8. The gripper device according to claim 1, further comprising a belt arranged to extend directly across distal ends of grippers when the grippers are spaced apart so that the belt is able to extend over the food product to be picked up and to extend around the food product when the grippers have been moved towards each other to pick up the food product such that their distal ends penetrate between the food product and a support surface.

9. The gripper device according to claim 1, wherein movement of the tail bender device relative to the pair of jaws further comprises moving the tail bender device in a sidewise direction towards the food product such that said bending of the tail-like part comprises compressing the food product into a shorter shape.

10. A method of picking up a pliable food product having a tail-like part from a pick up area and releasing it at a releasing area using a gripper which comprises:
   a support,
   a pair of jaws mounted to the support for movement of distal ends thereof towards each other defining a closing position of the pair of jaws and away from each other defining an open position of the pair of jaws, and
   a tail bender device attached to the support and adjacent to one end of the pair of jaws, the tail bender device being moveable in relation to the pair of jaws and is configured to bend the tail-like part while transferring the food product from the pick up area until releasing it at the releasing area,
   wherein the step of moving the tail bender device in relation to the pair of jaws comprises moving the tail bender device at least partly below the pair of jaws when being in closing position such that said bending of the tail-like part comprises pushing the tail-like part downward.

11. The method according to claim 10, wherein the step of moving the tail bender device in relation to the pair of jaws comprises moving the tail bender device sidewise towards food product such that said bending of the tail-like part comprises compressing the food product into a shorter shape.

12. The method according to claim 10, wherein the orientation of the tail bender device is controlled by a control unit in response from image data indicating the position of the tail-like part.

13. A robotic system comprising:
   a position detection means for detecting positions of incoming pliable food products having a tail-like part,
   a gripper device comprising:
   a support,
   a pair of jaws mounted to the support for movement of distal ends thereof towards each other defining a closing position of the pair of jaws and away from each other defining an open position of the pair of jaws, and
   a tail bender device attached to the support and adjacent to one end of the pair of jaws,
   a control unit for controlling the movement of the gripper device in accordance to the detected positions of the pliable food products when picking up the pliable food product having a tail-like part from a pick up area and releasing it at a releasing area,
   wherein the tail bender device is moveable in relation to the pair of jaws and is configured to bend the tail-like part while transferring the food product from the pick up area until releasing it at the releasing area,
   wherein the step of moving the tail bender device in relation to the pair of jaws comprises moving the tail bender device at least partly below the pair of jaws when being in closing position such that said bending of the tail-like part comprises pushing the tail-like part downward.

* * * * *